(12) United States Patent
Huh

(10) Patent No.: US 11,858,378 B2
(45) Date of Patent: Jan. 2, 2024

(54) BATTERY DISCHARGE CONTROL SYSTEM INCLUDING A BATTERY SAVER FOR MOTOR-DRIVEN VEHICLE AND BATTERY DISCHARGE CONTROL METHOD USING THE BATTERY SAVER FOR MOTOR-DRIVEN VEHICLE

(71) Applicants: HYUNDAI MOTOR COMPANY, Seoul (KR); KIA MOTORS CORPORATION, Seoul (KR)

(72) Inventor: Jee Wook Huh, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 154 days.

(21) Appl. No.: 17/095,991

(22) Filed: Nov. 12, 2020

(65) Prior Publication Data

US 2022/0001769 A1 Jan. 6, 2022

(30) Foreign Application Priority Data

Jul. 1, 2020 (KR) .................. 10-2020-0080681

(51) Int. Cl.
*B60L 58/14* (2019.01)
*H02J 7/00* (2006.01)

(52) U.S. Cl.
CPC .......... *B60L 58/14* (2019.02); *H02J 7/00032* (2020.01); *H02J 7/0048* (2020.01); *H02J 7/0063* (2013.01); *H02J 7/00712* (2020.01)

(58) Field of Classification Search
CPC ...................................... B60L 58/14
USPC ...................................... 320/136
See application file for complete search history.

(56) References Cited

U.S. PATENT DOCUMENTS

| 2012/0169117 A1* | 7/2012 | Park | H02J 7/00304 320/136 |
| 2015/0367747 A1* | 12/2015 | Decker | B60L 58/21 320/136 |
| 2016/0141893 A1* | 5/2016 | Lee | G06F 1/263 320/134 |
| 2016/0362013 A1* | 12/2016 | Gibeau | B60L 1/04 |

* cited by examiner

*Primary Examiner* — Yalkew Fantu
(74) *Attorney, Agent, or Firm* — Lempia Summerfield Katz LLC

(57) ABSTRACT

A battery discharge control system and method for a motor-driven vehicle may monitor a SOC of an auxiliary battery in real time and control electric power supply to a first electric component, a wireless communication module, a vehicle controller, and a second electric component which is an always-on component, based on a predetermined order according to the SOC of the auxiliary battery, thereby inhibiting the complete discharge of the auxiliary battery and eliminating driver's discomfort.

12 Claims, 3 Drawing Sheets

Figure 1:
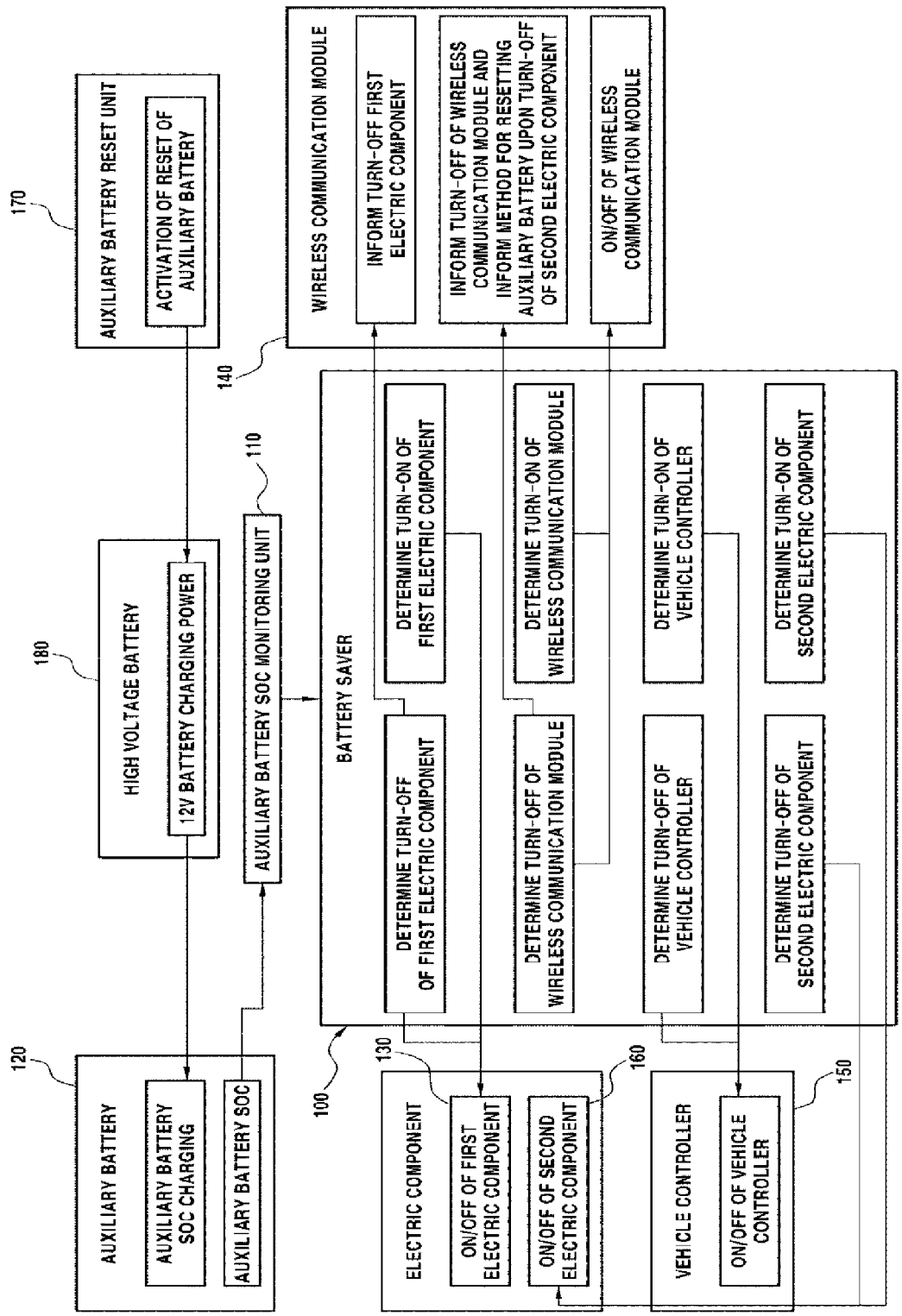

BATTERY DISCHARGE CONTROL SYSTEM INCLUDING A BATTERY SAVER FOR MOTOR-DRIVEN VEHICLE AND BATTERY DISCHARGE CONTROL METHOD USING THE BATTERY SAVER FOR MOTOR-DRIVEN VEHICLE

CROSS-REFERENCE TO RELATED APPLICATION

This application claims priority to and the benefit of Korean Patent Application No. 10-2020-0080681, filed on Jul. 1, 2020, the entire contents of which are incorporated herein by reference.

FIELD

The present disclosure relates to a battery discharge control system and method for a motor-driven vehicle to reduce or minimize battery discharge.

BACKGROUND

The statements in this section merely provide background information related to the present disclosure and may not constitute prior art.

As is well known, a hybrid vehicle, an electric vehicle, a hydrogen fuel cell vehicle, or the like is equipped with an electric motor as a traveling driving source, and such a vehicle is referred to as an eco-friendly vehicle or a motor-driven vehicle.

The motor-driven vehicle is equipped with an auxiliary battery used as power for various controllers and electric components (for example, a lamp, an audio, a cluster, an air conditioner, and the like) as well as a high voltage battery used as power for a traveling motor or the like.

Considering the fact that the auxiliary battery is used only for supplying power to various controllers at the time of starting the motor-driven vehicle, and in order to secure cost competitiveness, the auxiliary battery having the specification with the reduced capacity is being applied.

On the other hand, the number of controllers applied as the electric component using the auxiliary battery as power increases, and as a driver arbitrarily mounts a black box, an electrical consumable, or the like in the vehicle, a required state of discharge of the auxiliary battery increases.

Accordingly, as an example of the related art, when a battery voltage is a predetermined voltage or less due to the capacity limitation of the auxiliary battery, a control logic serving as a battery saver which limits the use of the electric components is applied.

For reference, the battery saver function, for example, refers to a kind of battery management method for preventing discharge of a battery due to a rapid increase in use load of the electric components.

However, we have discovered that when the battery saver function which limits the use of the electric components is applied, power for all the electric components is cut off, so that there is a problem in that a locking or unlocking operation of a vehicle door using a smart key becomes impossible, and as a result, discomfort which is desired to perform a manual locking or unlocking operation using a door key occurs.

For example, the locking or unlocking of the door may become impossible because power is not supplied to a door lock module which communicates with the smart key possessed by the driver, and the door is required to be locked or unlocked by inserting the door key into a key home provided in a door outside handle.

As another example of the related art, a method for charging the auxiliary battery from the high voltage battery is applied when the auxiliary battery is reset, but when a state of charge (SOC) of the auxiliary battery is a predetermined level or less, there is discomfort in which the driver is required to reset the auxiliary battery through a predetermined procedure as power is cut off.

However, we have found that when the power for the electric components is cut off until the auxiliary battery is charged, and likewise, the locking or unlocking operation of the vehicle door using the smart key becomes impossible, and as a result, there is the discomfort in that the manual locking or unlocking operation using the door key is required.

As described above, as the locking and unlocking operation of the door using the smart key rather becomes impossible due to the conventional battery saver function and power-off function of the auxiliary battery, there occurs a quality problem which causes the driver to feel uncomfortable.

The above information disclosed in this Background section is only for enhancement of understanding of the background of the disclosure and accordingly it may contain information that does not form the prior art that is already known to a person of ordinary skill in the art.

SUMMARY

The present disclosure provides a battery discharge control system and method for a motor-driven vehicle, which may monitor a state of charge (hereinafter referred to as SOC) of an auxiliary battery in real time, and control the turn-off of a first electric component, the turn-off of a wireless communication module, the turn-off of a vehicle controller, and the turn-off of a second electric component which is an always-on power component, which are sequentially performed based on a predetermined order according to the SOC of the auxiliary battery, thereby inhibiting a complete discharge of the auxiliary battery and simultaneously eliminating the driver's discomfort such as making the locking or unlocking operation of the vehicle door impossible.

In an exemplary form of the present disclosure, a battery discharge control system of a motor-driven vehicle may include: an auxiliary battery configured to supply electric power to a plurality of electric components, a vehicle controller, and a wireless communication module; a battery SOC monitoring unit configured to monitor a SOC of the auxiliary battery; and a battery saver configured to cut off electric power supply from the auxiliary battery to the plurality of electric components, the vehicle controller, and the wireless communication module based on a predetermined turn-off priority order and SOC information of the auxiliary battery provided from the battery SOC monitoring unit.

In one form, the plurality of electric components are composed of a second electric component including a door lock module, a trunk lead lock module, a clock, and an audio memory which are always-on power components, and a first electric component other than the always-on power components.

Particularly, the battery saver is configured to execute the turn-off of the first electric component when the SOC of the auxiliary battery is less than a first reference value, to execute the turn-off of the wireless communication module when the SOC of the auxiliary battery is less than a second reference value smaller than the first reference value, to execute the turn-off of the vehicle controller when the SOC of the auxiliary battery is less than a third reference value smaller than the second reference value, and to execute the turn-off of the second electric component when the SOC of the auxiliary battery is less than a fourth reference value smaller than the third reference value.

In another form, when the SOC of the auxiliary battery is less than a second reference value which is smaller than the first reference value, the wireless communication module is configured to communicate with a predetermined external terminal to visually or audibly inform that the first electric component is turned off, when the SOC of the auxiliary battery is less than a first reference value, and in addition, communicate with the external terminal to visually or audibly inform at least one of a method for restarting a vehicle or a method for resetting the auxiliary battery before turning off the second electric component.

The battery discharge control system according to the present disclosure is configured to further include an auxiliary battery reset unit resetting the auxiliary battery.

In addition, the battery saver is provided to control the second electric component to be turned on, and to perform a control of sequentially turning on the vehicle controller, the wireless communication module, and the first electric component, when the auxiliary battery is reset and the SOC of the auxiliary battery exceeds at least the first reference value.

In another exemplary form of the present disclosure, a battery discharge control method of a motor-driven vehicle may include: monitoring, by a battery state of charge (SOC) monitoring unit, a SOC of an auxiliary battery; confirming, by a battery saver, whether a vehicle is turned off; and when the turn-off of the vehicle is confirmed, cutting off, by the battery saver, electric power supply from the auxiliary battery to a plurality of electric components, a vehicle controller, and a wireless communication module based on a predetermined priority order and the monitored SOC information of the auxiliary battery.

Particularly, the battery discharge control method according to the present disclosure is configured to execute the turn-off of the first electric component when the SOC of the auxiliary battery is less than a first reference value, to execute the turn-off of the wireless communication module when the SOC of the auxiliary battery is less than a second reference value smaller than the first reference value, to execute the turn-off of the vehicle controller when the SOC of the auxiliary battery is less than a third reference value smaller than the second reference value, and to execute the turn-off of the second electric component when the SOC of the auxiliary battery is less than a fourth reference value smaller than the third reference value.

In addition, the battery discharge control method according to the present disclosure further includes: visually or audibly informing that the first electric component is turned off, when the SOC of the auxiliary battery is less than a first reference value; and visually or audibly informing at least one of a method for restarting a vehicle and a method for resetting the auxiliary battery according to the turn-off of the second electric component, when the SOC of the auxiliary battery is less than a second reference value smaller than the first reference value.

In addition, according to the battery discharge control method according to the present disclosure, when a reset process of the auxiliary battery is executed by the method for resetting the auxiliary battery, charging the auxiliary battery from a high voltage battery is further performed, and after the charging of the auxiliary battery is performed, a control step of controlling the second electric component to be turned on, and sequentially turning on the vehicle controller, the wireless communication module, and the first electric component is further performed, when the SOC of the auxiliary battery exceeds at least the first reference value.

The present disclosure provides the following effects through the above configurations.

First, based on the control of the battery saver according to the SOC of the auxiliary battery, the turn-off of the first electric components (such as a lamp, an audio, a cluster, and an air conditioner rather than the always-on power component), the turn-off of the wireless communication module, the turn-off of the vehicle controller, the turn-off of the second electric components (always-on power components such as a door lock module, a trunk lead lock module, a clock, and an audio memory), and the like are sequentially performed, thereby delaying the complete discharge of the auxiliary battery and simultaneously eliminating the driver's discomfort such as making the locking or unlocking operation of the vehicle door using the smart key impossible.

Second, by informing the reset method for charging the auxiliary battery using the wireless communication module, which is a kind of infotainment device, even if all the electric components and always-on power components are turned off, the follow-up which allows the auxiliary battery to be charged through the reset process of the auxiliary battery may be smoothly done, thereby improving convenience for the driver.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the disclosure are discussed infra.

Further areas of applicability will become apparent from the description provided herein. It should be understood that the description and specific examples are intended for purposes of illustration only and are not intended to limit the scope of the present disclosure.

DRAWINGS

Figure 2:
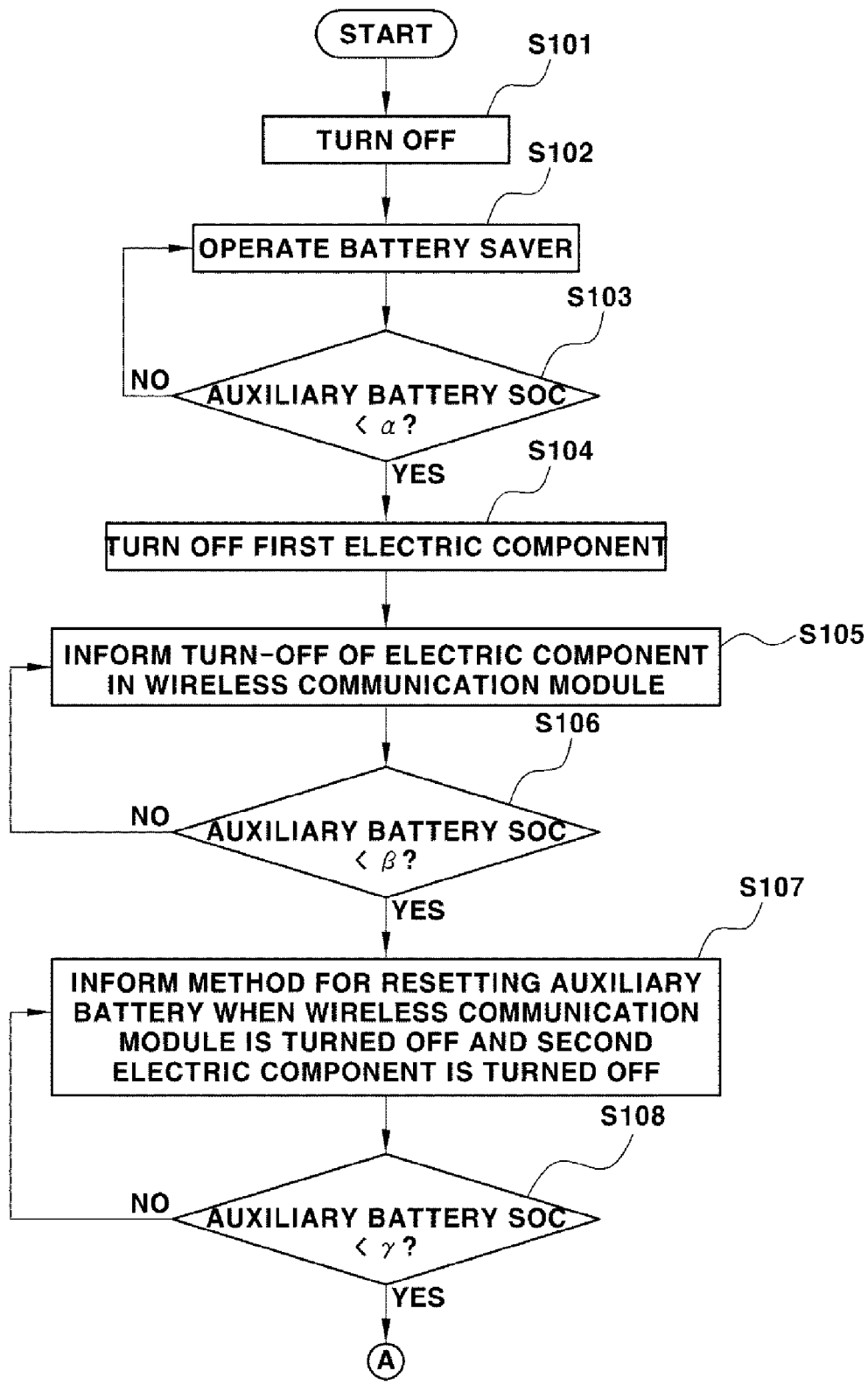
Figure 3:
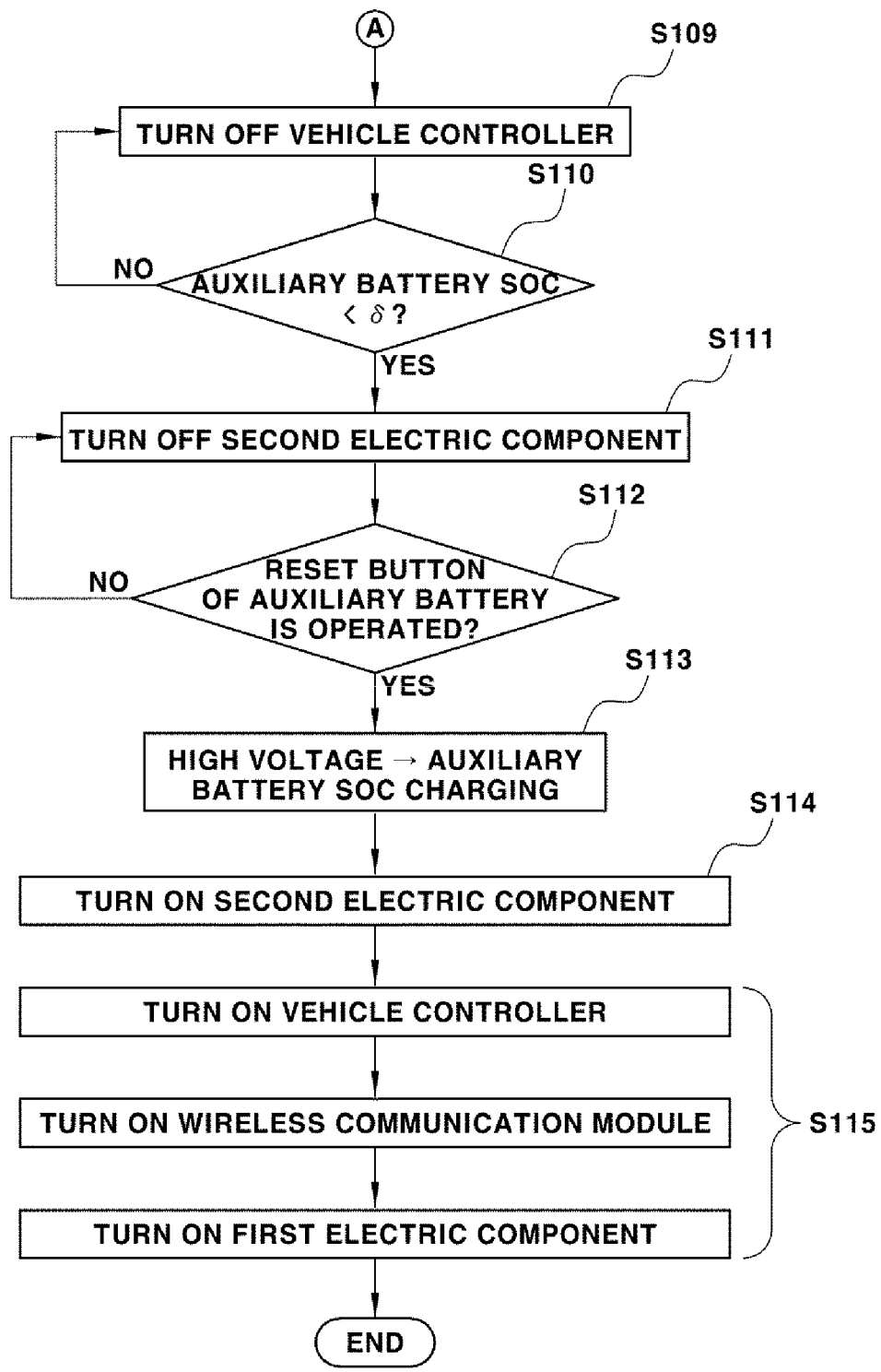

In order that the disclosure may be well understood, there will now be described various forms thereof, given by way of example, reference being made to the accompanying drawings, in which:

FIG. 1 is a control block diagram illustrating a battery management system for a motor-driven vehicle according to one form of the present disclosure; and FIGS. 2 and 3 are flowcharts illustrating a battery management method of the motor-driven vehicle according to another form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in section by the particular intended application and use environment. As publicly known in the art, some of exemplary forms may be illustrated in the accompanying drawings from the viewpoint of function blocks, units and/or modules.

Those skilled in the art will understood that blocks, units and/or modules are physically implemented by electronic (or optical) circuits such as logic circuits, discrete components, processors, hard wired circuits, memory devices and wiring connections. When the blocks, units and or modules are implemented by processors or other similar hardware, the blocks, units and modules may be programmed and controlled through software (for example, codes) in order to perform various functions discussed in this specification.

FIG. 1 is a control block diagram illustrating a battery management system for a motor-driven vehicle according to the present disclosure, and reference numeral 100 denotes a battery saver.

The battery saver 100 is a kind of controller for managing a battery of which an operation is started when a vehicle is turned off to perform ON/OFF controls of first electric components (for example, a lamp, an audio, a cluster, and an air conditioner, and the liker rather than an always-on power component), a wireless communication module related to a kind of infotainment which receives vehicle information from an external terminal via communication, a vehicle controller, second electric components (for example, the always-on power components such as a door lock module, a trunk lead lock module, a clock, and an audio memory), and the like, which use an auxiliary battery as power, in a predetermined order based on SOC information of the auxiliary battery, thereby managing the SOC of the auxiliary battery and simultaneously reducing or minimizing the discharge of the auxiliary battery.

A battery SOC monitoring unit 110 which provides SOC information of the auxiliary battery is connected to the battery saver 100 so as to transmit electrical signals.

The battery SOC monitoring unit 110 monitors the SOC of the auxiliary battery 120 in real time to provide the monitored SOC to the battery saver 100, and may be employed as a battery management system (BMS) which is a type of controller managing all states of the battery.

For example, since the battery management system includes a function of detecting information such as a voltage, a current, and temperature of the auxiliary battery, and calculating the SOC of the auxiliary battery using the detected information, the battery management system may be employed as the battery SOC monitoring unit 110.

Referring to FIG. 1, the battery saver 100 is connected to a first electric component 130, a wireless communication module 140, a vehicle controller 150, and a second electric component 160, and the like, which use an auxiliary battery 120 as power, so as to transmit ON/OFF control signals to them, respectively.

Accordingly, the battery saver 100 may control the turn-off of the first electric component 130, the turn-off of the wireless communication module 140, the turn-off of the vehicle controller 150, and the turn-off of the second electric component 160 in a predetermined order according to the SOC information of the auxiliary battery 120 provided by the battery SOC monitoring unit 110 in a state where the vehicle is turned off.

The first electric component 130 refers to electric components (for example, lamps, an audio, a cluster, an air conditioner, and the like) which are not always-on power components which cause a driver not to feel uncomfortable greatly even when the vehicle is not operated until being restarted in the state where the vehicle is turned off, among the electric components operated by the power received from the auxiliary battery. Thus the turn-off control of the first electric component 130 may be first performed by the battery saver 100.

The second electric component 160 is a type of electric component operated by the power received from the auxiliary battery, and refers to as the always-on power components (for example, a door lock module, a trunk lead lock module, a clock, an audio memory, and the like) which may cause the driver to feel greatly uncomfortable when not operated in the turned-off state. In one form, the turn-off control of the second electric component 160 is last performed by the battery saver 100 in consideration of the driver's discomfort.

More specifically, when the power for all the electric components including the first electric component 130 and the second electric component 160 is cut off simultaneously by a power cut-off control of the battery saver 100, the door lock module or the like operated through communication with the smart key among the second electric components 160 does not operate, and as a result, as a locking or unlocking operation of the vehicle door using the smart key becomes impossible, the driver inevitably feels the discomfort such as having to lock or unlock the door through the manual operation using the door key or the like, so that the turn-off control of the second electric component 160, which is an always-on power component including the door lock module, is lastly performed.

The wireless communication module 140 refers to a kind of infotainment related information technology (IT) device mounted inside the vehicle so as to integrally receive a navigation function, a surrounding information provision function, an entertainment function, a vehicle state information provision function, a vehicle control operation function, and the like through the wireless communication with an external terminal, and is called a separate name made for each vehicle manufacturer.

According to the present disclosure, the wireless communication module 140 is configured to visually or audibly inform that the first electric component 130 is turned off by the control signal of the battery saver 100, and in addition, to visually or audibly inform a method for restarting the vehicle and a method for resetting the auxiliary battery according to the turn-off of the second electric component 160 in advance.

The vehicle controller 150 may be a hybrid control unit (HCU) which is a top-level controller of the motor-driven vehicle, a motor control unit (MCU) for controlling a motor, a transmission control unit (TCU) for controlling shifting, a battery management system (BMS) which is a controller managing all states of the battery, or the like, and the vehicle controllers 150 are mostly maintained in the turned-off state when turned off, and some controllers are switched to an ON state for the necessary control during parking, but in order to reduce or minimize the discharge of the auxiliary battery 120, a control of turning off the vehicle controller 150 before the second electric component 160 is turned off is performed.

Accordingly, the battery saver 100 may be configured to execute the turn-off of the first electric component 130 when a current SOC of the auxiliary battery 120 is less than a first reference value, to execute the turn-off of the wireless communication module 140 when the current SOC of the auxiliary battery 120 is less than a second reference value smaller than the first reference value, to execute the turn-off of the vehicle controller 150 when the current SOC of the auxiliary battery 120 is less than a third reference value smaller than the second reference value, and to execute the turn-off of the second electric component 160 when the current SOC of the auxiliary battery 120 is less than a fourth reference value smaller than the third reference value.

Meanwhile, since the driver may reset the auxiliary battery in a state of being well aware of the method for resetting the auxiliary battery informed by the wireless communication module 140, a button-type auxiliary battery reset unit 170 may be configured at a predetermined location around a driver seat (for example, a crash pad around a steering wheel or the like).

As illustrated in FIG. 1, when the driver operates the auxiliary battery reset unit 170, charging from the high voltage battery 180 to the auxiliary battery 120 is performed by 12V battery charging power.

In one form, in order to eliminate the driver's discomfort caused by the impossibility to operate the second electric component (for example, the impossibility to operate the door lock module), when it is confirmed that the SOC of the auxiliary battery exceeds at least the first reference value after the charging from the high voltage battery 180 to the auxiliary battery 120 is performed, the battery saver 100 controls the second electric component 160 which is the always-on power component to be turned on, and to perform the control of sequentially turning on the vehicle controller 150, the wireless communication module 140, and the first electric component 130.

Here, a battery discharge control method according to the present disclosure based on the aforementioned system configuration will be sequentially described as follows.

FIGS. 2 and 3 are flowcharts illustrating a battery management method of the motor-driven vehicle according to some forms of the present disclosure.

First, when the vehicle is turned off (S101), the operation of the battery saver 100 is started (S102).

For example, when a turn-off signal of the vehicle is transmitted to the battery saver 100, the battery saver 100 starts to operate.

Subsequently, the battery SOC monitoring unit 110 transmits information obtained by monitoring the current SOC of the auxiliary battery to the battery saver 100.

Accordingly, the battery saver 100 sequentially performs the turn-off control of the first electric component 130, the turn-off control of the wireless communication module 140, the turn-off control of the vehicle controller 150, and the turn-off control of the second electric component 160 in a predetermined order according to SOC information of the auxiliary battery 120 provided from the battery SOC monitoring unit 110.

To this end, the battery saver 100 first confirms whether the current SOC of the auxiliary battery 120 is less than a first reference value ($\alpha$) (S103), and as the confirmation result, when the current SOC of the auxiliary battery 120 is less than the first reference value ($\alpha$), the battery saver 100 performs the turn-off control of the first electric component 130 (S104).

At this time, the first reference value ($\alpha$) is an SOC at a level at which the performance of the auxiliary battery rapidly decreases, and is usually set to less than 30%, which may be changed according to the battery specification.

Accordingly, the lamps, audio, cluster, air conditioner, and the like classified as the first electric component 130 are first turned off, and these first electric components 130 are electric components which do not operate until the vehicle is restarted in the state where the vehicle is turned off unlike the second electric component 160 which is the always-on power component, so that the driver does not feel uncomfortable greatly.

In one form, when the first electric component 130 is turned off, a step of visually or audibly informing that the first electric component 130 is turned off by the wireless communication module 140 (S105) is performed, so that the driver may recognize that the first electric component is in the turned-off state in order to manage the discharge of the auxiliary battery.

Next, the battery saver 100 confirms whether the current SOC of the auxiliary battery 120 is less than a second reference value ($\beta$) less than the first reference value ($\alpha$) (S106), and as the confirmation result, when the current SOC of the auxiliary battery 120 is less than the second reference value ($\beta$), the battery saver 100 performs the turn-off control of the wireless communication module 140 (S107).

At this time, the second reference value ($\beta$) is set to the SOC at a level at which the performance of the auxiliary battery rapidly decreases, and in another form, may be set to less than 22% which is a medium level between the first reference value ($\alpha$) and a fourth reference value ($\delta$) which is the SOC at which the life of the auxiliary battery rapidly deteriorates, which may be changed according to the battery specification.

In addition, the battery saver 100 visually or audibly informs the method for restarting the vehicle and the method for resetting the auxiliary battery after the second electric component 160, which is the always-on power component, is turned off immediately before the wireless communication module 140 is turned off, so that the driver may be well aware of the method for resetting the auxiliary battery, and then, as described later, the auxiliary battery may be easily reset after the second electric component 160 is turned off.

Next, the battery saver 100 confirms whether the current SOC of the auxiliary battery 120 is less than a third reference value ($\gamma$) smaller than the second reference value ($\beta$) (S108), and as the confirmation result, when the current SOC of the auxiliary battery 120 is less than the third reference value ($\gamma$), the battery saver 100 performs the turn-off control of the vehicle controller 150 (S109).

At this time, the third reference value ($\gamma$) is the SOC of a level at which the life of the auxiliary battery deteriorates, and is usually set to less than 18%, which may be changed according to the battery specification.

Accordingly, all the vehicle controllers including the HCU, the MCU, the TCU, the BMS, and the like may be turned off, thereby reducing or minimizing the discharge of the auxiliary battery in the state where the vehicle is turned off, and delaying the complete discharge of the auxiliary battery.

Next, the battery saver 100 confirms whether the current SOC of the auxiliary battery 120 is less than the fourth reference value (δ) smaller than the third reference value (γ) (S110), and as the confirmation result, when the current SOC of the auxiliary battery 120 is less than the fourth reference value (δ), the battery saver 100 controls the second electric component 160, which is the always-on power component, to be finally turned off to protect the life of the auxiliary battery (S111).

At this time, the fourth reference value (δ) is the SOC of a level at which the life of the auxiliary battery rapidly deteriorates, and is usually set to less than 15%, which may be changed according to the battery specification.

Accordingly, the battery saver 100 may lastly turn off the always-on power components such as the door lock module, trunk lead lock module, clock, and audio memory classified as the second electric component 160, thereby reducing or minimizing the driver's discomfort.

Nevertheless, the door lock module, which is one of the second electric components 160, is finally turned off in the state where the vehicle is turned off, so that the door lock module operated through communication with the smart key is not operated, thereby causing the driver to feel uncomfortable.

Accordingly, the driver may perform a reset process of the auxiliary battery according to the method for resetting the auxiliary battery 120 previously informed by the wireless communication module 140 (S112).

For example, when the driver operates the auxiliary battery reset unit 170 provided in a button form around the driver seat, charging from the high voltage battery 180 to the auxiliary battery 120 is performed by the 12V battery charging power (S113).

In one form, after the charging of the auxiliary battery is performed, when the auxiliary battery 120 is charged to exceed at least the first reference value (α), the battery saver 100 performs the control of turning on the second electric component 160 (S114), and then further performs the control of sequentially turning on the vehicle controller 150, the wireless communication module 140, and the first electric component 130 in order to eliminate the driver's discomfort due to the operation impossibility of the door lock module or the like (S115).

Accordingly, even if the second electric component 160, which is the always-on power component, is in the lastly turned-off state, the auxiliary battery may be charged through the reset process of the auxiliary battery by the driver as described above, thereby improving convenience for the driver.

What is claimed is:

1. A battery discharge control system of a motor-driven vehicle, comprising:
    an auxiliary battery configured to supply electric power to a plurality of electric components, a vehicle controller, and a wireless communication module;
    a battery state of charge (SOC) monitoring unit configured to monitor a SOC of the auxiliary battery; and
    a battery saver configured to cut off electric power supply from the auxiliary battery to the plurality of electric components, the vehicle controller, and the wireless communication module based on a predetermined turn-off priority order and SOC information of the auxiliary battery provided from the battery SOC monitoring unit,
    wherein the plurality of electric components includes:
        a second electric component comprising a door lock module, a trunk lead lock module, a clock, and an audio memory which are always-on power components, and
        a first electric component other than the always-on power components, and
    wherein the battery saver is configured to cut off the power supply from the auxiliary battery to the second electric component after cutting off the power supply to the first electric component.

2. The battery discharge control system of claim 1, wherein the battery saver is configured to:
    turn off the first electric component when the SOC of the auxiliary battery is less than a first reference value,
    turn off the wireless communication module when the SOC of the auxiliary battery is less than a second reference value which is smaller than the first reference value,
    turn off the vehicle controller when the SOC of the auxiliary battery is less than a third reference value which is smaller than the second reference value, and
    turn off the second electric component when the SOC of the auxiliary battery is less than a fourth reference value which is smaller than the third reference value.

3. The battery discharge control system of claim 1, wherein the wireless communication module is configured to communicate with a predetermined external terminal to visually or audibly inform that the first electric component is turned off, when the SOC of the auxiliary battery is less than a first reference value.

4. The battery discharge control system of claim 3, wherein when the SOC of the auxiliary battery is less than a second reference value which is smaller than the first reference value, the wireless communication module is configured to:
    communicate with the predetermined external terminal to visually or audibly inform at least one of a method for restarting a vehicle or a method for resetting the auxiliary battery before turning off the second electric component.

5. The battery discharge control system of claim 1, further comprising: an auxiliary battery reset unit configured to reset the auxiliary battery.

6. The battery discharge control system of claim 5, wherein when the auxiliary battery is reset and the SOC of the auxiliary battery exceeds a first reference value, the battery saver is configured to:
    first turn on the second electric component, and
    perform a control of sequentially turning on the vehicle controller, the wireless communication module, and the first electric component.

7. A battery discharge control method of a motor-driven vehicle, the method comprising:
    monitoring, by a battery state of charge (SOC) monitoring unit, a SOC of an auxiliary battery;
    confirming, by a battery saver, whether a vehicle is turned off; and
    when the vehicle is turned off, cutting off, by the battery saver, electric power supply from the auxiliary battery to a plurality of electric components, a vehicle controller, and a wireless communication module based on a predetermined priority order, and the monitored SOC of the auxiliary battery, wherein the plurality of electric components includes:
- a second electric component comprising a door lock module, a trunk lead lock module, a clock, and an audio memory which are always-on power components, and
- a first electric component other than the always-on power components, and wherein cutting off the electric power supply comprises: first cutting off the electric power supply to the first electric component and then cutting off the electric power supply to the second electric component.

8. The method of claim 7, wherein:
when the SOC of the auxiliary battery is less than a first reference value, the first electric component is turned off,
when the SOC of the auxiliary battery is less than a second reference value smaller than the first reference value, the wireless communication module is turned off,
when the SOC of the auxiliary battery is less than a third reference value smaller than the second reference value, the vehicle controller is turned off, and
when the SOC of the auxiliary battery is less than a fourth reference value smaller than the third reference value, the second electric component is turned off.

9. The method of claim 7, further comprising: when the SOC of the auxiliary battery is less than a first reference value, visually or audibly informing, by a wireless communication module, that the first electric component is turned off.

10. The method of claim 9, further comprising: when the SOC of the auxiliary battery is less than a second reference value smaller than the first reference value, visually or audibly informing, by the wireless communication module, at least one of a method for restarting a vehicle or a method for resetting the auxiliary battery when the second electric component is turned off.

11. The method of claim 10, further comprising:
when a reset process of the auxiliary battery is executed by the method for resetting the auxiliary battery, charging the auxiliary battery by a high voltage battery.

12. The method of claim 11,
wherein after charging the auxiliary battery and when the SOC of the auxiliary battery exceeds at least the first reference value, first turning on the second electric component, and sequentially turning on the vehicle controller, the wireless communication module, and the first electric component.

* * * * *